(No Model.)
F. A. HAKE.
HAME FASTENER.
No. 327,258. Patented Sept. 29, 1885.
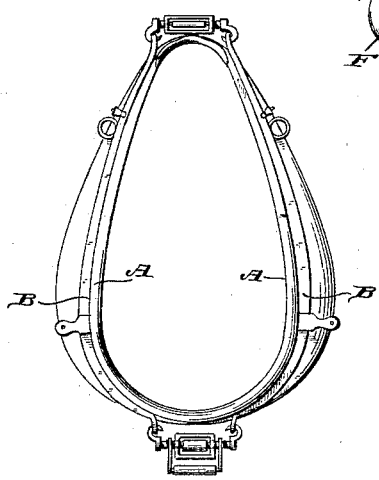
Fig. 1.
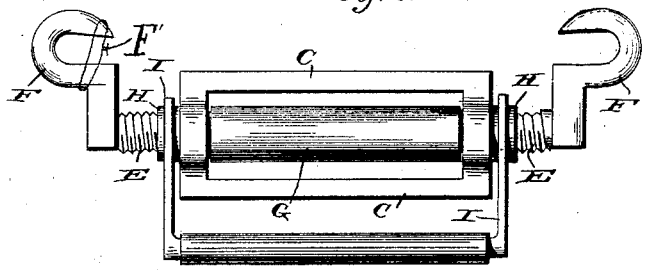
Fig. 2.
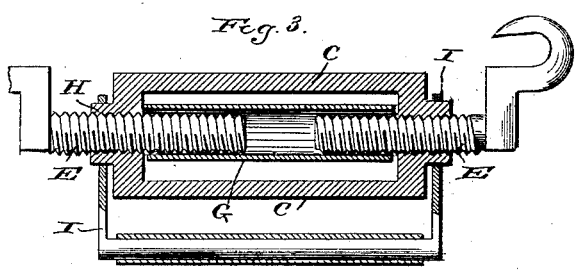
Fig. 3.
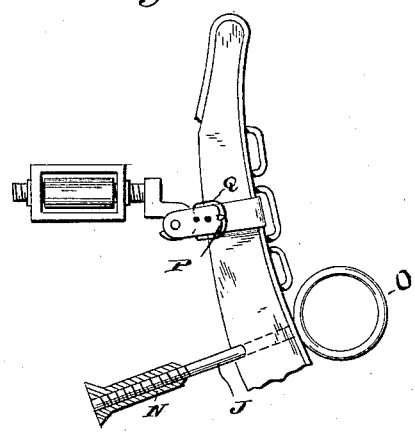
Fig. 7.
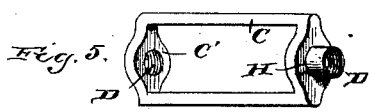
Fig. 4.
Fig. 5.
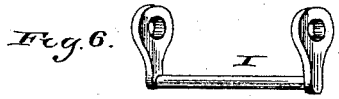
Fig. 6.
Witnesses
Robert Kirk
O. H. Jones.
Inventor
F. A. Hake
By his Attorney
J. S. Zerbe

UNITED STATES PATENT OFFICE.

FRANCIS A. HAKE, OF CUERO, TEXAS.

HAME-FASTENER.

SPECIFICATION forming part of Letters Patent No. 327,258, dated September 29, 1885.

Application filed July 27, 1885. (No model.)

*To all whom it may concern:*

Be it known that I, FRANCIS A. HAKE, of Cuero, in the county of DeWitt and State of Texas, have invented a new and useful Improvement in Hame Fasteners and Regulators, which improvement is fully set forth in the following specification and accompanying drawings, in which—

Figure 1 represents a front view of a collar and hame equipped with my improved fastening devices. Fig. 2 is an enlarged front view of the adjustable fastener or regulator. Fig. 3 is a central longitudinal vertical section of the same. Figs. 4, 5, and 6 are detail views of the parts constituting the fastener; Fig. 7, modifications of the fastener.

The object of the present invention is to provide a hame-fastener.

It consists of an adjustable regulating fastener for the upper and lower ends of the hames, and this fastener is further provided with a swinging loop, to which the breast-strap may be attached on the lower fastener and the strap on the upper fastener when desired, all of which will now be set forth in detail.

In the accompanying drawings, A represents the collar, and B the hames. These may both be made in the usual manner. The adjustable securers and regulators for holding together the ends of the hames consist of a rectangularly-formed piece, C, having through the end limbs, C', the screw-threaded apertures D, which receive the right and left screw-threaded bolts E. These bolts carry the hooks F at the outer ends, as shown. A sleeve, G, of equal length with the interior of the frame C, and having a bore sufficiently large to admit the threaded bolt E, is placed endwise within the frame C, after which the bolts E are screwed into the frame C. The sleeve therefore serves as a guide or support for the inner ends of the bolts E, and also protects the threads of the bolts from wear when exposed to surrounding objects.

The ends of the frame are provided, preferably, with flanges H, which serve as journals for the loop or hanger I. To this hanger the breast-strap is attached when in use on the lower ends of the hame. When used on the upper ends of the hame, the strap may be attached thereto. It is obvious, however, that this loop I will not be necessary on the upper fastener, except in limited cases, and can be dispensed with. It will also be observed that the fastener can be made much lighter for the upper than the lower ends of the hames.

The hooks F are designed to be attached to the ends of the hames. I prefer open hooks, as shown; but it is preferable to have one of the hooks provided with a fastening device, whereby it may be permanently attached to one hame. Thus the bent wire F', Fig. 2, represents a convenient form. However, any equivalent fastening device will answer the purpose. In the form of hame shown by Fig. 7 the bolt J may pass through the hame and have its inner end threaded to fit into a permanent screw-threaded socket, N, attached to the collar. In this case the outer end of the bolt may be provided with a loop or ring, O, such as are usually employed on hames.

It is also obvious that the hooks F may be attached to loops P around the hames, instead of directly to the hame; or a strap and buckle, Q, may be interposed between the hook F and hame.

In some instances it may be advisable to use more than one securing-bolt, J, on each hame, and I do not therefore limit myself to one only.

Having described my invention, what I claim as new is—

1. An adjustable hame-regulator consisting of the frame C, provided with threaded opening at the ends, and flanges H, in combination with the right and left screw-threaded bolts E, having the hooks F, the sleeve G, and the loop I, substantially as herein set forth.

2. The fastener consisting of the frame C, having the flanges H, the right and left screw-threaded bolts E, provided with hooks, sleeve G, and hanger I, in combination with the hames, substantially as and for the purposes herein shown.

In testimony that I claim the foregoing I have hereunto set my hand, this 12th day of June, 1885, in the presence of witnesses.

FRANCIS A. HAKE.

Witnesses:
S. E. DAYMON,
L. MILLER.